US012669137B2

(12) United States Patent
Oinonen et al.

(10) Patent No.: US 12,669,137 B2
(45) Date of Patent: Jun. 30, 2026

(54) ARRANGEMENT AND METHOD FOR CONTROLLING AT LEAST ONE OPERATION OF A WORK MACHINE AND WORK MACHINE

(71) Applicant: PONSSE OYJ, Vieremä (FI)

(72) Inventors: Mikko Oinonen, Vieremä (FI); Aleksi Kivi, Vieremä (FI)

(73) Assignee: PONSSE OYJ, Vieremä (FI)

( * ) Notice: Subject to any disclaimer, the term of this patent is extended or adjusted under 35 U.S.C. 154(b) by 0 days.

(21) Appl. No.: 17/925,156

(22) PCT Filed: May 11, 2021

(86) PCT No.: PCT/FI2021/050349
§ 371 (c)(1),
(2) Date: Nov. 14, 2022

(87) PCT Pub. No.: WO2021/229151
PCT Pub. Date: Nov. 18, 2021

(65) Prior Publication Data
US 2023/0184270 A1 Jun. 15, 2023

(30) Foreign Application Priority Data
May 14, 2020 (FI) ..................................... 20205484

(51) Int. Cl.
*F15B 15/20* (2006.01)
*G05D 3/12* (2006.01)
(Continued)

(52) U.S. Cl.
CPC ............. *F15B 15/204* (2013.01); *G05D 3/12* (2013.01); *A01G 23/003* (2013.01); *A01G 23/08* (2013.01)

(58) Field of Classification Search
CPC ...... F15B 11/044; F15B 15/204; F15B 13/00; F15B 2211/351; F15B 2211/353; F15B 2211/761
See application file for complete search history.

(56) References Cited

U.S. PATENT DOCUMENTS 5,160,239 A * 11/1992 Allen ........................ E02F 9/26
700/65
5,428,958 A 7/1995 Stenlund
(Continued)

FOREIGN PATENT DOCUMENTS

CN 101310114 11/2008
CN 110206081 9/2019
(Continued)

OTHER PUBLICATIONS

International Search Report for PCT/FI2021/050349, mailed Aug. 13, 2021, 4 pages.
(Continued)

*Primary Examiner* — Thomas E Lazo
(74) *Attorney, Agent, or Firm* — Nixon & Vanderhye PC

(57) ABSTRACT
A work machine (1) comprises at least one structural element (21), at least one pressure medium operated actuator (22) for establishing at least one operation of the work machine, and at least one detection device (23) to determine the position of the structural element (21) of the work machine. An arrangement for controlling at least one operation of the work machine (1) comprises: a control valve arrangement (24) for controlling the actuator (22), and a control device (25) for controlling the control valve arrangement (24). The control device (25) is adapted to control said control valve arrangement (24) for adjusting the pressure and/or volume flow on the return line of the actuator (22) as dependent on the position of the structural element (21).

18 Claims, 3 Drawing Sheets

(51) Int. Cl.
*A01G 23/00* (2006.01)
*A01G 23/08* (2006.01)

(56) References Cited

U.S. PATENT DOCUMENTS

| | | | | | |
|---|---|---|---|---|---|
| 5,446,981 | A | * | 9/1995 | Kamada | E02F 3/437 |
| | | | | | 701/50 |
| 5,768,810 | A | * | 6/1998 | Ahn | E02F 3/436 |
| | | | | | 701/50 |
| 10,030,355 | B2 | * | 7/2018 | Yamashita | E02F 9/2271 |
| 10,612,212 | B2 | * | 4/2020 | Kondo | E02F 9/226 |
| 2005/0155258 | A1 | * | 7/2005 | Nishimura | E02F 9/24 |
| | | | | | 37/403 |
| 2011/0264334 | A1 | * | 10/2011 | Murota | E02F 9/2033 |
| | | | | | 701/50 |
| 2013/0345939 | A1 | * | 12/2013 | Magaki | E02F 9/2075 |
| | | | | | 701/50 |
| 2015/0147147 | A1 | * | 5/2015 | Uchiyama | E02F 9/2033 |
| | | | | | 414/685 |
| 2015/0151952 | A1 | | 6/2015 | Kivi et al. | |
| 2015/0284930 | A1 | * | 10/2015 | Tsukamoto | E02F 3/32 |
| | | | | | 701/50 |
| 2015/0368876 | A1 | * | 12/2015 | Nakagaki | E02F 9/2033 |
| | | | | | 701/50 |
| 2016/0186787 | A1 | * | 6/2016 | Opdenbosch | F15B 11/0445 |
| | | | | | 60/459 |
| 2018/0080196 | A1 | * | 3/2018 | Kondo | E02F 9/2296 |
| 2019/0145083 | A1 | | 5/2019 | Rausch et al. | |
| 2020/0040547 | A1 | * | 2/2020 | Ogawa | E02F 3/32 |
| 2020/0115882 | A1 | | 4/2020 | Sano et al. | |
| 2023/0184270 | A1 | | 6/2023 | Oinonen et al. | |

FOREIGN PATENT DOCUMENTS

| | | |
|---|---|---|
| CN | 115243945 | 10/2022 |
| CN | 115552130 | 12/2022 |
| DE | 20 2009 013 507 | 2/2010 |
| EP | 1 345 489 | 10/2008 |
| EP | 2 644 903 | 10/2013 |
| EP | 4 150 219 | 3/2023 |
| WO | 02/086327 | 10/2002 |
| WO | 2006/100340 | 9/2006 |
| WO | 2020/006538 | 1/2020 |
| WO | 2021/229151 | 11/2021 |

OTHER PUBLICATIONS

Written Opinion of the ISA for PCT/FI2021/050349, mailed Aug. 13, 2021, 6 pages.

Finnish Search Report for FI 20205484, mailed Dec. 1, 2020, 2 pages.

Heikkila, "Energy Efficient Boom Actuation Using a Digital Hydraulic Power Management System", Tampere University of Technology, ISBN 978-952-15-3758-5. https://tuteris.tut.fi/portal/files/6249582/Heikkil_1388.pdf, 2016, 15 pages.

Apr. 22, 2024 Office Action issued in Canadian Patent Application No. 3,182,753, pp. 1-4.

May 21, 2024 Search Report issued in European Patent Application No. 21803217.5, pp. 1-10.

Aug. 8, 2024 Opposition against FI Patent No. 130526, corresponding to FI Application No. 20205484.

Jan. 31, 2025 Office Action issued in Brazilian Patent Application No. BR112022022345-5, pp. 1-4.

Dec. 12, 2025 Office Action issued in Chinese Patent Application No. 202180034454.9, pp. 1-13 [English translation included].

* cited by examiner

ARRANGEMENT AND METHOD FOR CONTROLLING AT LEAST ONE OPERATION OF A WORK MACHINE AND WORK MACHINE

This application is the U.S. national phase of International Application No. PCT/FI2021/050349 filed May 11, 2021, which designated the U.S. and claims priority to FI Patent Application No. 20205484 filed May 14, 2020, the entire contents of each of which are hereby incorporated by reference.

BACKGROUND

The invention relates to work machines and in particular to an arrangement for controlling at least one operation of the work machine.

In work machines that use pressure medium operated, such a hydraulic-operated, actuators to establish operations of the work machine, it is in some cases possible to utilise a so-called counterpressure, that is, the pressure on a return line of the hydraulic system of the actuator when, for example, precise control of an operation is required. If such an operation is, for example, moving a structural element of the work machine, it may be necessary to stop the structural element precisely in a specific position. To implement the above, the pressure on the return line may be utilised, resulting in better control of the movement. However, in certain usage situations, such as when working on a slope, the counterpressure may be too high, causing unnecessary energy consumption, or too low, weakening the precision of the control.

BRIEF DESCRIPTION OF THE INVENTION

It is an object of the invention to provide a novel method and an apparatus implementing the method, as well as a work machine. The object of the invention is achieved by a method, arrangement and work machine that are characterised by what is stated in the independent claims. Preferred embodiments are disclosed in the dependent claims.

The inventive idea is based on adjusting the counterpressure according to the usage situation.

An advantage of the method, arrangement, and work machine according to the method is that the precision and optimal energy consumption of the operations may be assured in different usage situations.

BRIEF DESCRIPTION OF THE FIGURES

The invention will now be described in more detail in connection with preferred embodiments and with reference to the accompanying drawings, in which.

The figures are intended to illustrate the solutions disclosed in the description and the claims. The figures are not shown to scale, and not all of mutually similar features are necessarily numbered in all the figures.

DETAILED DESCRIPTION OF THE INVENTION

Figure 1:
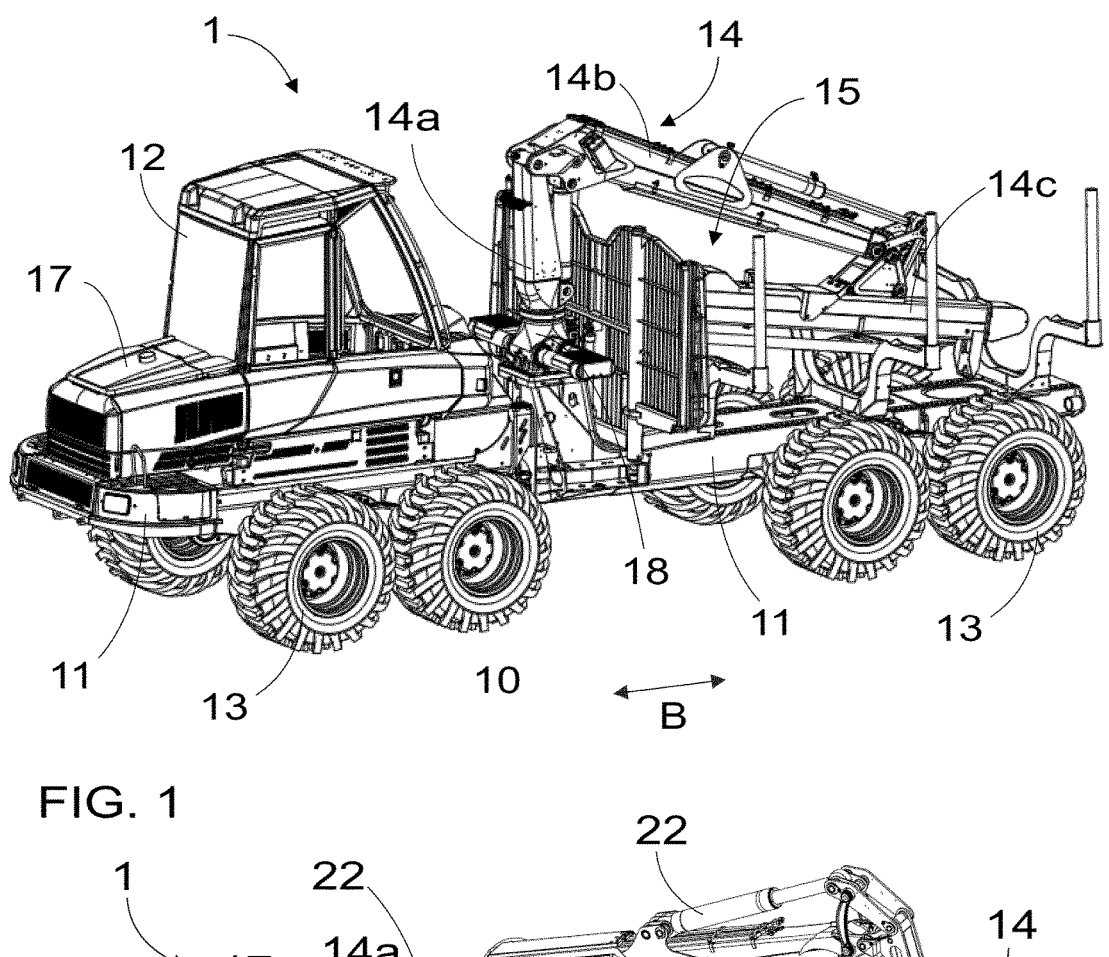
FIG. 1 shows work machine.
Figure 2:
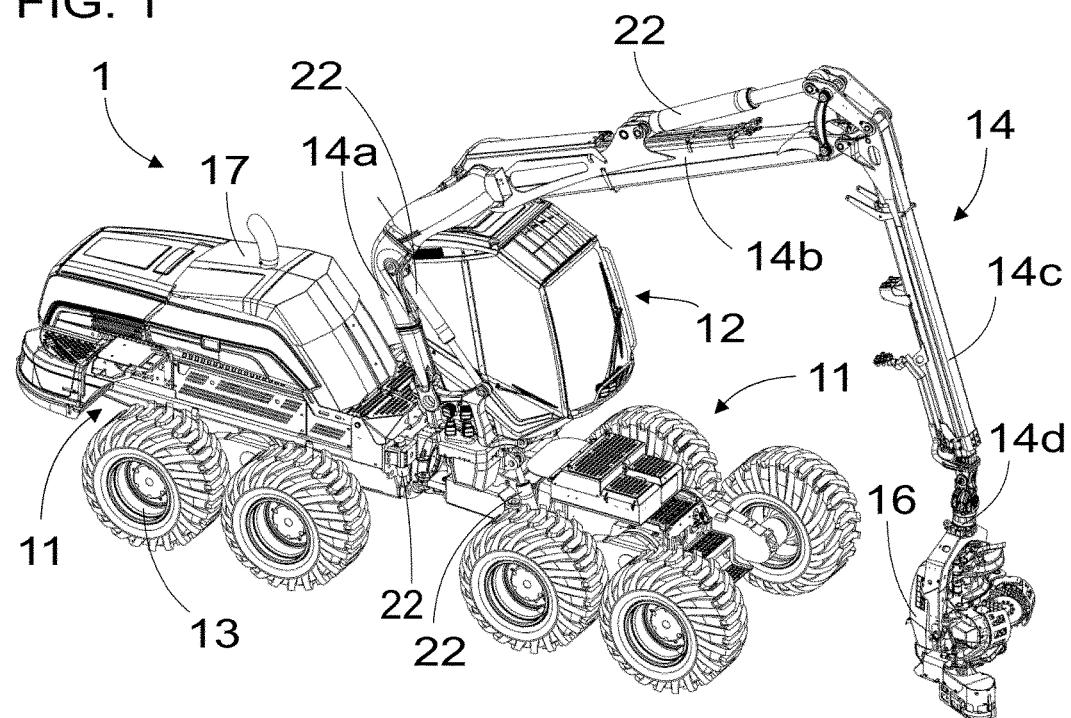
FIG. 2 shows a second work machine.

With reference to FIGS. 1 and 2, FIGS. 1 and 2 show working machines. A working machine 1 may comprise a mobile working machine 1 and particularly advantageously a mobile working machine 1 adaptable to move in an inclined and/or uneven surface. Such a mobile working machine may be, for example, a forest work unit, such as a forwarder as in FIG. 1, a harvester as in FIG. 2, or another forest machine, such as a drive machine of another type suitable for carrying a load, or a combination of a forwarder or harvester, or another mobile working machine such as a mining machine or excavator.

The working machine 1 may comprise one or more body parts 11 and a boom structure 14 adapted to the at least one body part. The working machine may also comprise a tool 16 adapted to the boom structure 14, for example. The tool may comprise, for example, a hoisting member, such as a load bucket and/or a wood handling tool, such as a harvester head.

Depending on the embodiment, the working machine 1 may also comprise other structural elements. For example, the working machine 1 may comprise a control cabin 12 adapted on at least one body part 11. The work machine 1 may further comprise moving means 13, which moving means 13 may comprise at least one of the following: wheels adapted on an axle, wheels adapted on a swinging axle, wheels adapted on a tandem axle, a track system or another means known per se to cause the work machine to move in relation to its working surface. It will be obvious for a person skilled in the art that the working machine 1 typically comprises numerous additional structural and functional structure parts and entities depending on the type of the working machine, such as a cargo space 15, power source 17, and so forth.

Figure 3:
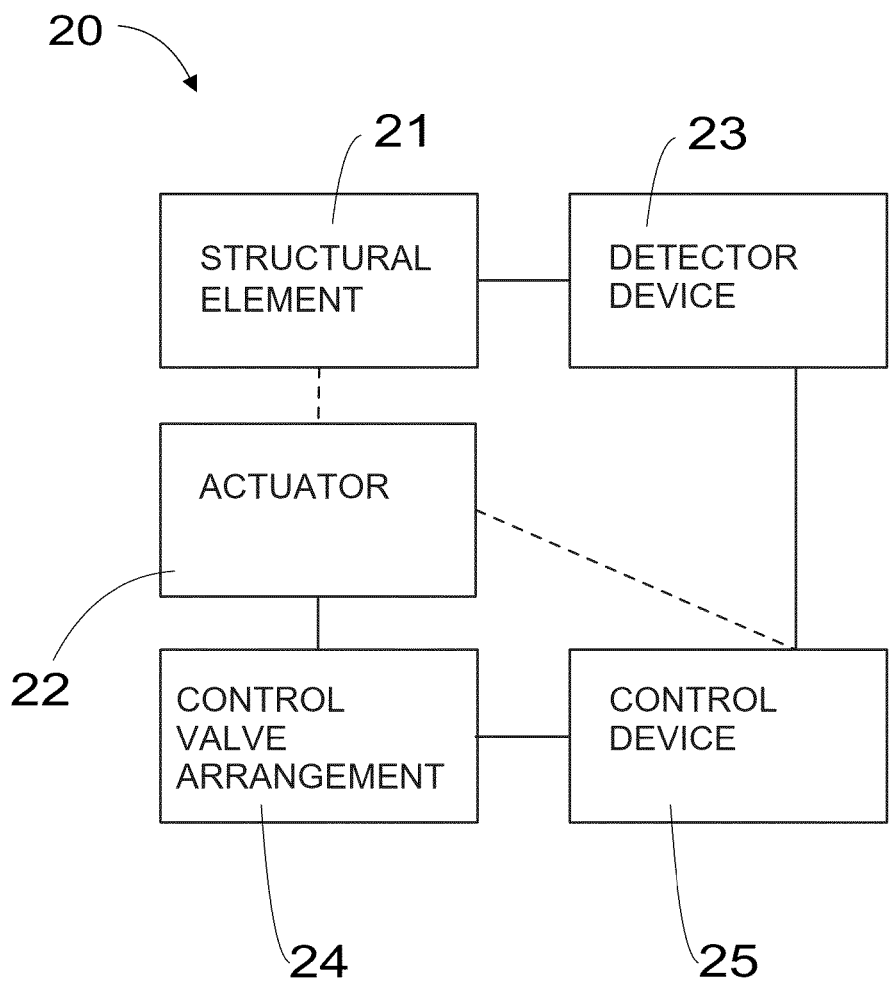
FIG. 3 shows an arrangement for controlling at least one operation the work machine.

The work machine 1 may further comprise an arrangement 20 for controlling at least one operation of the work machine 1. One of such arrangements is shown in FIG. 3. The work machine 1 may in such a case comprise at least one structural element 21, at least one pressure medium operated actuator 22 for establishing at least one operation of the work machine, and at least one detection device 23 to determine the position of the work machine's structural element 21 in question. The pressure medium operated actuator 22 may comprise, for example, a hydraulically operated or pneumatically operated actuator, or another pressure medium operated actuator. The arrangement 20 of FIG. 3 for controlling at least one operation of a work machine 1 may in such a case comprise a control valve arrangement 24 for controlling the actuator 22, and a control device 25 for controlling the control valve arrangement 24.

In an embodiment, the control valve arrangement 24 comprises a meter-in meter-out valve. In an embodiment, the meter-in meter-out valve may on its own or together with one or more components form a control valve arrangement 24. A meter-in meter-out valve 24 refers to a directional control valve type of valve whose both directions to the actuator, so the supply line and return line, may be controlled independently of each other. Such valves are also referred to as meter in/meter out valves. In an embodiment, the control valve arrangement 24, which allows the pressure and/or volume flow on the return line of the actuator 22 to be adjusted in the manner disclosed in this description, may also be implemented by means of other pressure medium components than a meter-in meter-out valve. Further in this description, adjusting the pressure and/or volume flow on the return line refers to adjusting the pressure of the return flow and/or the volume flow on the return line.

In an embodiment, the structural element 21 may comprise a body part 11, boom structure 14 or part thereof, and/or a tool 16 of the work machine. In different embodiments, the structural element 21 may also comprise another structural element of a work machine.

In an embodiment, the pressure medium operated actuator 22 may comprise, for example, a hydraulic cylinder, hydraulic pump, or a hydraulic motor.

In an embodiment, the detection device 23 may comprise at least one of the following: an inclinometer, angular velocity sensor, such as a 3D angular velocity sensor, acceleration sensor, such as a 3D acceleration sensor, angular acceleration sensor, gyroscope, inertial measurement unit (IMU), articulation angle sensor, linear position sensor, angular position sensor, magnetometer, capacitive distance sensor, position sensor of the pressure medium actuator, such as position sensor of the hydraulic cylinder, radar, optical sensor, such as LiDAR (Light Detection and Ranging), or camera.

The control device 25 is advantageously adapted to control the control valve arrangement 24 for adjusting the pressure and/or volume flow on the return line of the actuator 22 as dependent on the position of the structural element 21, that is, dependent on the position determined by means of the detection device 23. The control device 25 may comprise data processing means such as a controller or data processor. The control valve arrangement 24 may comprise a meter-in meter-out valve described in the above. The actuator 22 may comprise the pressure medium operated actuator of the work machine 1, which is configured to establish at least one operation of the work machine 1, such as a movement or a change in the movement of at least one structural element of the work machine. This structural element may be the same structural element 21 whose position is detected by the detection device 23, or another structural element of the work machine 1, adapted fixedly or movably in the structural element 21 either directly of by means of at least one other structural element.

The pressure and or volume flow on the return line of the actuator 22 may be adjusted as dependent on the position of the structural element 21 advantageously so that when the movement caused by the actuator is directed in an opposite direction in relation to the gravity vector C, the pressure and/or volume flow is adjusted lower than when a movement of similar dynamics, such as speed or acceleration, is directed in the direction of the gravity vector C. In other words, when the position of the structural element 21 and the direction of the actuator movement are such that the Earth gravity resists the actuator movement, the pressure and/or volume flow of the actuator 22 return line is adjusted lower than when a movement comprising similar dynamics, such as speed or acceleration, is such that the acceleration of the Earth's gravity accelerates the movement of the actuator. It will be obvious for a person skilled in the art that the movement direction of the movement caused by the actuator 22 may also have other components than a component acting on in the direction of the gravity vector C or in a direction opposite in relation to it, such as when the movement is directed at an angle in relation to the direction of the gravity vector C. In this case, from the viewpoint of the disclosed solution, the essential factor is a component parallel with the direction of the gravity vector C, and whether the component in question affects in the direction of the gravity vector C or in an opposite direction in relation to it. An advantage of such a control is that the changing of a load into a so-called escaping load may be prevented, in other words a situation where gravity exceeds the force resisting the movement, and therefore improve the control of a load movement in movements requiring high dynamics, such as high acceleration or high deceleration, or great precision, and prevent cavitation problems in hydraulic cylinders, for example.

In an embodiment, the control device 25 may additionally be adapted to adjust the pressure and/or volume flow on the return line of the actuator 22 by means of the control valve arrangement 24 as dependent on the speed and/or acceleration of the structural element 21. In other words, in such embodiments the pressure and/or volume flow on the return line of the actuator 22 is actively adjusted because the pressure on the return line of the actuator 22 does not in such a case depend only on the intended movement of the actuator but also on the usage situation, such as the position and/or movement state of the structural element 21 of the work machine 1, such as the speed and/or acceleration of the structural element 21. In this description and in the claims disclosed in connection with it, speed may comprise linear speed and/or angular speed, and acceleration may comprise linear acceleration and/or angular acceleration.

In this description, pressure and/or volume flow on a return line of the actuator 22 refers to the pressure and/or volume flow of the pressure medium returning from the actuator 22. In other words, the control device 25 is used to control the valve arrangement 24 so that the pressure and/or volume flow on the return line of the actuator between the actuator and control valve arrangement 24, in other words, prior to the control valve arrangement 24, is adjusted. So, the pressure and/or volume flow on the return line of the actuator does not in this context refer to the pressure and/or volume flow on the return line of the actuator after the control valve arrangement 24, for example, to the pressure and/or volume flow on the tank line of the hydraulic system. Similarly, adjusting the pressure and/or volume flow on the return line of the actuator does not in this context refer to adjusting the pressure and/or volume flow on the return line after the control valve arrangement 24, for example, to adjusting the pressure and/or volume flow on the tank line of the hydraulic system.

In an embodiment, the structural element 21, on the position and/or movement state of which the pressure and/or volume flow on the return like of the actuator 22 is adjusted as depending on, comprises a structural element which may be moved by the effect of the actuator 22, or is fixedly adapted in such a structural element which may be moved by the effect of the actuator 22. In another embodiment, the structural element 21, on the position and/or movement state of which the pressure and/or volume flow on the return like of the actuator 22 is adjusted as depending on, comprises a structural element in relation to which a second structural element of the work machine 1 may be moved by the effect of the actuator 22.

In an embodiment, the work machine 1, for example, a mobile work machine such as a forest work unit, may comprise an arrangement 20 disclosed in this description and the associated drawings.

Figure 4:
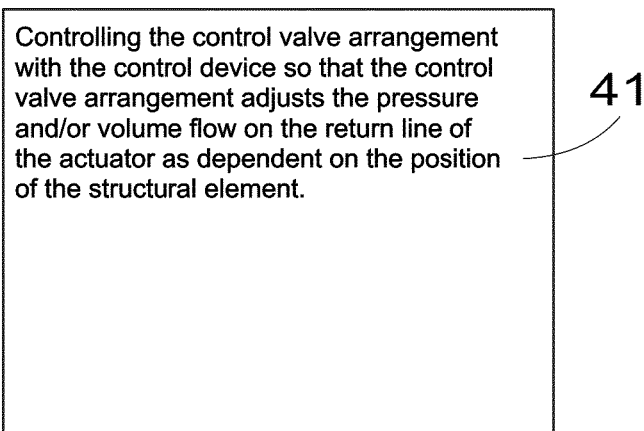
FIG. 4 shows a method for controlling at least one operation the work machine.

FIG. 4 shows a method for controlling at least one operation of a work machine. The work machine 1 may in such a case comprise at least one structural element 21, at least one pressure medium operated actuator 22 for establishing said at least one operation, and at least one detection device 23 to determine the position of the work machine's 1 structural element 21. In the method of FIG. 4, the control device 25 is used to control 41 the control valve arrangement 24 so that the control valve arrangement 24 adjusts the pressure and/or volume flow on the return line of the actuator 22 as dependent on the position of the structural element 21, that is, on the position determined by means of the detection device 23. The structural element 21, actuator 22, detection device 23, control valve arrangement 24, control device 25 and/or work machine 1 may correspondingly comprise the structural element 21, actuator 22, detection device 23, control valve arrangement 24, control device 25 and/or work machine 1 disclosed in this description, for example, in connection with an embodiment of the arrangement 20.

Figure 5:
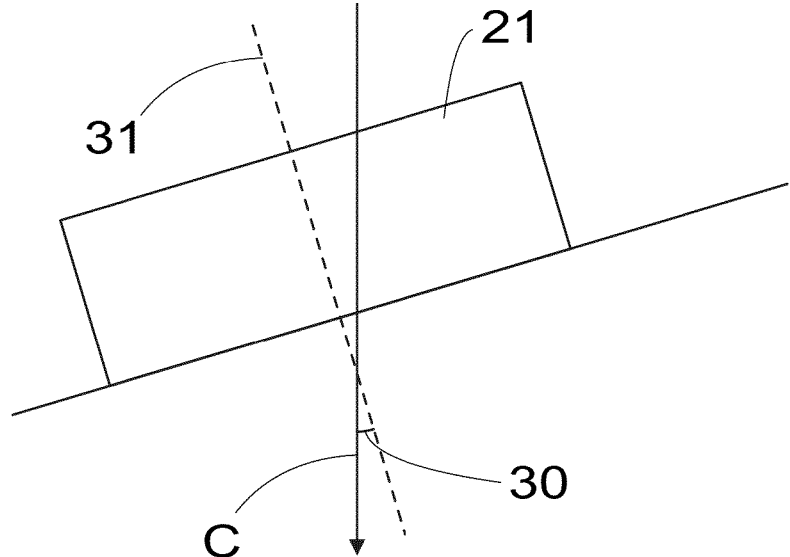
FIG. 5 illustrates a position of a structural element.

In an embodiment, the position of the structural element 21 comprises a tilt angle 30 of the structural element 21 in the direction of at least one axis 31 of the structural element 21 in relation to a reference direction, such as the direction of the gravity vector C, and/or a reference point. This is illustrated in FIG. 5.

In an embodiment, the method allows the control device 25 to be used to adjust the pressure and/or volume flow on the return line of the actuator 22 by means of the control valve arrangement 24 as dependent on the speed and/or acceleration of the structural element 21. Acceleration in this case may be positive or negative. Negative acceleration may also be referred to as deceleration. As described in the above, speed may comprise linear speed and/or angular speed, and acceleration may comprise linear acceleration and/or angular acceleration.

In yet another embodiment, the control device 25 may be used, by means of said control valve arrangement 24, to adjust the pressure and/or volume flow on the return line of the actuator 22 as not only dependent on the speed and/or acceleration of said structural element 21 but also as dependent on at least one other factor in addition to the speed and/or acceleration of the structural element 21 or instead of the speed and/or acceleration of the structural element 21. In an embodiment, this other factor may comprise, for example, a mass caused by the load, whereby the actuator 22 may comprise an actuator achieving at least one operation of a loader or boom structure and a load adapted to the loader or boom structure, such as a load hoisted or handled by means of the loader or boom structure. In such a case, adjusting the pressure and/or volume flow on the return line of the actuator 22 also as dependent on a mass caused by a load may comprise adjusting the pressure and/or volume flow on the return line or the actuator 22 more effectively or more in the direction to which the pressure and/or volume flow of the return line needs to be adjusted, if the load is larger than if the load is smaller. In other words, the pressure and/or volume flow of the return line of the actuator 22 may in such a case be adjusted the more effectively or more to the direction in which the pressure and/or volume flow needs to be adjusted based on the position of the structural element the larger the mass caused by the load is. Other such factors along with the mass caused by the load may be the required great precision of the movement such as turning the structural element, which the actuator 22 acts on or which is caused by the actuator 22 and/or pressure information of the actuator 22.

In an embodiment, the other factor may comprise pressure information of the pressure medium of the actuator 22, and the position of the structural element 21 may comprise the position of the actuator 22. In such a case, the adjusting of the pressure and/or volume flow on the return line of the actuator 22 may be adapted to take into account the loading on the actuator 22 in so-called open adjustment circuit solutions, i.e., feedforward solutions.

In an embodiment, the control device 25 may comprise at least a regulator comprising control codes to control the control valve arrangement 24 to adjust the pressure and/or volume flow on the return line of the actuator 22. Such a regulator may be used, for example, in open circuit adjusting solutions, i.e., a so-called feedforward control. In such a case, control may be changed on the basis of the determined position of the structural element 21.

The regulator may comprise, for example, a central processing unit of the work machine, or another controller or data processor adapted to receive measurement signals from at least one detection device 23, and the control codes may comprise software adapted to define, on the basis of the measurement signals, control commands which may be conveyed to the control valve arrangement 24 to control the control valve arrangement.

In an embodiment, the regulator may further comprise means to receive at least feedback information for controlling the control valve arrangement 24. The means for receiving feedback details may comprise in addition to a central processing unit, control unit, or data processor, for example, cabling to convey measurement signals from at least one detection device 23 and/or another detector, such as a sensor, to the control device 25. Such a regulator may be used, for example, in adjusting a closed circuit i.e., a so-called feedback. In such a case, control may be changed as dependent on the determined position of the structural element 21 and in addition by means of the regulator so that the control quantity, in other words, the pressure and/or volume flow on the return line of the actuator 22 reaches the target value.

The feedback information may comprise at least pressure information on the return line of the actuator 22. In such a case, the pressure information on the return line of the actuator 22 may be determined with a pressure sensor, for example. In such a case, the means for receiving the feedback information may further comprise a pressure sensor to determine the pressure information on the return line of the actuator 22. In such a case, the pressure information on the return line of the actuator 22 may be adapted to update information on an actual need, or needlessness, for adjustment, the precise amount of adjustment, or the target pressure level.

The control device 25 may be adapted to receive a control command issued, for example, by an operator or control system, targeted at the actuator 22 and/or an operation it achieves, to receive a position of the structural element 21 determined by the detection device 23 in the direction of at least one axis 31 in relation to the reference direction such as the gravity vector C direction, and or in relation to a reference point and to determine the direction of movement determined by the control command in relation the reference direction and/or reference point. Further, the control device 25 may be adapted to determine the target pressure on the return line of the actuator 22 based on what the direction determined by the control command is in relation to the reference direction and/or reference point and to adjust the pressure and/or volume flow on the return line of the actuator to adjust the pressure on the return line of the actuator to the determined target value or towards it.

In an embodiment, the control device 25 may be adapted to control the control valve arrangement 24 to adjust the pressure on the return line of the actuator 22 lower when the position of the structural element 21, that is, the position determined with the aid of the detection device 23, and the direction of the movement of the actuator 22 are such that the acceleration of the Earth's gravity resists the movement of the actuator 22 than when the position of the structural element, that is, the position determined with the aid of the detection device 23, and the direction of the movement of the actuator 22 are such that the acceleration of the Earth's gravity accelerates the movement of the actuator 22.

In an embodiment, the operation comprises moving at least one structural element of the boom structure 14 of the work machine or loader in relation to the structural element 21 and/or a second structural element of the boom structure 14 or loader.

In an embodiment, the computer program product may be stored on computer-readable media and executable by a processor, the computer program product comprising a computer-readable program code that is arranged to control an arrangement disclosed in this description and/or the associated drawings and/or work machine to carry out the steps of a method disclosed in this description and/or associated drawings when the program code is run in the processor.

In an embodiment, the work machine 1 may, for example, comprise a timber loader, forwarder, or another work machine comprising a boom structure 14 or a loader and a tool 16 adapted to the boom structure or loader to handle timber. In such an embodiment, the control valve arrangement 24 allows the control of an actuator 22 controlling at least one operation of a boom structure or loader. Control may be implemented, for example, so that the control device 25 is adapted to control the control valve arrangement 24 to adjust the pressure and/or volume flow on the return line of the actuator 22 controlling at least one operation of a boom structure or loader as dependent on the position of at least one structural element 21 of a work machine 1, for example, such as at least one body part 11 of the work machine.

In the various embodiments disclosed in this description, a movement controlled by the actuator 22 may refer to a movement that starts from stationary at the time the adjustment disclosed in this description of the pressure and/or volume flow on the return line of the actuator 22 starts, or a movement that is already in motion at the time the adjustment disclosed in this description of the pressure and/or volume flow on the return line of the actuator 22 starts. The movement may comprise movement of the structural element 21 whose position is determined, or the movement of another structural element of the work machine.

In an embodiment, adjusting the pressure and/or volume flow on the return line of the actuator 22 may be adapted to use the position of at least one structural element of the work machine 1 and/or the speed and/or the acceleration of the actuator 22 and/or structural element as the feedback information for the control of the control valve arrangement 24, such as for the control of a meter-in meter out valve (meter in/meter out), for calculating the volume flow and/or pressure on the return line of the actuator 22. The structural element may in such a case be, for example, the structural element 21 whose position is determined, or another structural element of a work machine and it may comprise, for example, at least one body part 11 of the work machine. The position may in such a case comprise the tilt angle of at least one structural element of the work machine 1, such as the structural element 21, for example, the body part 11. Particularly advantageously, the position may in this case comprise the tilt angle of the body part to which the boom structure or loader is adapted. In such an embodiment, the disclosed arrangement and method allows the pressure and/or volume flow on a return line of a single direction of movement of a boom structure or loader, that is, the so-called return counterpressure, so that the pressure on the return line is as low as possible to minimize energy usage, but high enough to guarantee good control of the movement. This is most advantageous in movements requiring high dynamics.

When the work machine 1, such as a forwarder or a similar work machine handling timber by means of a boom structure and/or loader, is, for example, parked on a steep slope, this affects substantially the centre of gravity of the load and the load change directions of different booms/boom parts compared to working on an even surface. In such a case, the actuator 22 may alone or together with other actuators be adapted to cause at least one movement of the boom/boom parts. The pressure and/or volume flow on the return line of the actuator 22 may be adjusted according to an embodiment disclosed in this description and the associated drawings as dependent on the tilt angle caused by the inclination of the working surface of the work machine 1. This way, the pressure and/or volume flow on the return line of the actuator may be adapted such that the movement may be controlled, but energy consumption is as small as possible.

In an embodiment, the load may be turned towards the ascent, when working on a slope, by a hydraulic cylinder of the tilting platform of the loader/boom structure 14, for example. In such a case, the actuator 22 may therefore comprise, for example, a hydraulic cylinder adapted to tilt the tilting platform 18 of a loader/boom structure to tilt, for example, the so-called vertical pillar 14a of the loader/boom structure, adapted in the tilting platform. When turning the vertical pillar 14a towards the ascent, the load is not a so-called escaping load, that is, the load is not moved to the direction of the effect of the Earth's gravity vector. In such a case, the pressure on the return line of the actuator may be adjusted lower than when a load is moved in the direction of the Earth's gravity vector when the Earth's gravity accelerates the movement.

In other embodiments, the same principle may be applied for working on a slope so that the actuator 22 comprises instead of or in addition to the hydraulic cylinder of a tilting platform at least one of the following actuators: an actuator for turning the loader/boom structure, actuator for folding the loader/boom structure, actuator for lifting the loader/boom structure, actuator for the work machine's frame steering, actuator of the work machine's bulldozer blade, actuator for stabilizing the position of the body part of the work machine (actuator used in implementing the so-called active frame feature), or a winch actuator. In other respects, the embodiments may correspond to the adjustment solution disclosed in connection with the hydraulic cylinder of the tilting platform of the loader/boom structure. In each case, the actuator 22 may comprise, for example, a pressure medium cylinder such as a hydraulic cylinder or a hydraulic motor.

In an embodiment, the structural element 21 may comprise at least one body part 11 of the work machine 1, and the actuator 22 may comprise at least one actuator of the frame steering of the work machine 1. In such a case, the control device 25 may be adapted to control the control valve arrangement 24 to adjust the pressure and/or volume flow on the return line of the actuator 22 as dependent on the position of the structural element 21 so that when the body part 11 is turned towards the ascent, the pressure on the return line is lower than when the body part 11 is turned on an even surface. Correspondingly, the control device 25 may be adapted to control the control valve arrangement 24 to adjust the pressure and/or volume flow on the return line of the actuator 22 as dependent on the position of the structural element 21 so that when the body part 11 is turned towards a descent, the pressure on the return line is higher than when the body part 11 is turned on an even surface. The detector device 23 may comprise, for example, a position sensor or a sensor module which may be adapted on a front body or rear body of the work machine 1. The position of the structural element 21 may in this case comprise the position of the body part in relation to a second body part or surface, or a mutual rotating angle between two successive body parts.

In an embodiment, the adjustment solution presented in the above in connection with the hydraulic cylinder of a tilting platform of a loader/boom structure may be utilised in dynamic usage situations of an open circuit, such as feeding a harvester head and drive power transmission. In other words, the actuator 22 may comprise, for example, feeding a harvester head or an actuator for the drive transmission. In such a case, when stopping in an ascent, the pressure on the return line may be adjusted as low as possible. Correspondingly, where feeding a trunk in the direction of an ascent with a harvester head, the pressure on the return line may be adjusted as low as possible.

In the above embodiments, the slope may be steep in relation to the direction B of the longitudinal axis of the work machine, or a transverse axis which is transverse with respect to it.

In an embodiment, an arrangement and/or method disclosed in this description and the associated drawings may be adapted in a work machine 1 the control of whose loader/boom structure may be adapted tip controlled, so to speak. Such tip controlled boom structures are known per se and therefore the principle of the actual tip control is not disclosed in any more detail in this context. On work machines comprising tip control, the pressure on the return line typically varies, because it is comparable to the volume flow. In such a case, moving a tip 14*d* of the boom structure after the bottom dead centre, and an external load possibly adapted on it, such as timber, below the other parts of the boom structure, such as a luffing boom (knuckle boom) 14*c*, main boom/lifting boom 14*b*, and/or vertical pillar (14*a*), the pressure on the return line of at least one actuator moving the boom structure or at least one part thereof is typically too high from the viewpoint of counterpressure purposes. To solve the above problem, an arrangement and/or method disclosed in this description and the associated drawings may be applied to such a tip controlled work machine 1, whereby the actuator 22 may comprise a boom structure and/or a part thereof, such as a tip, a luffing boom, main boom/lifting boom, and/or vertical pillar, an actuator achieving the movement, such as a hydraulic cylinder, the structural element 21 may comprise a tip 14*d*, a luffing boom 14*c*, main boom/lifting boom 14*b*, and/or vertical pillar (14*a*) of the work machine 1, and the position of the structural element 21 may comprise the position of the boom structure part in question, such as the position of the tip 14*d*, luffing boom 14*c*, main boom/lifting boom 14*b*, and/or vertical pillar (14*a*), in relation to at least one second part of the boom structure. In such a case, the control device 25 may be adapted to control the control valve arrangement 24 to control the actuator 22 so that the control valve arrangement 24 is controlled to adjust the pressure and/or volume flow on the return line of the actuator 22 as dependent on the position of the structural element 22, determined by means of the detection device 23. The control valve arrangement 24 may in such a case be adapted to adjust the pressure and/or volume flow on the return line of the actuator 22 so that when detecting the shift of the structural element 21 away from the bottom dead centre, the pressure on the return line of the actuator 22 is adjusted lower than when the structural element 21 is moved towards the bottom dead centre.

In an embodiment, an arrangement and/or method disclosed in this description and the associated drawings may be adapted in a work machine 1, such as a forwarder, when lifting timber on top of a large pile, when handling stumps or other fuelwood. In such a case, an extension of the boom structure may need to be folded upwards over the pile, in relation to the remaining boom structure. The situation is the same, as concerns the extension of the boom structure, as in the above embodiments where working took place in the ascent direction. In other words, the pressure and/or volume flow on the return line of the actuator that moves the boom structure extension may be adjusted so that the pressure on the return line is lower when the boom structure extension is moved upwards than when the boom structure extension is moved downwards.

In an embodiment, the actuator 22 may comprise an actuator for feeding a harvester head, tilting a saw and/or harvester head. An arrangement and/or method disclosed in this description and the associated drawings may in such a case be applied by adjusting the pressure and/or volume flow on the return line of the actuator 22 as dependent on the position of the structural element 21, such as a harvester head or body part 11 of the work machine, or another structural element, in at least one of the following ways: the pressure on the return line of the actuator is adjusted as low as possible when feeding timber, the pressure on the return line of the actuator is adjusted when stopping the feed to the desired timber length as dependent on whether feeding takes place on an even surface, downwards on a slope, or upwards on a slope. In such a case, the detection device 23 may comprise a position sensor of the work machine 1, work machine body 11, or grab module of the harvester head.

In different embodiments, the arrangement and/or method now disclosed as well as its features may be utilized either in open or closed circuit pressure medium systems, such as open or closed circuit hydraulic systems.

The disclosed arrangements and methods or their features may be utilised so that the when the actuator 22 is used in such a position or for such a movement where the Earth's gravity effect or a similar external factor slows movement down, the pressure and/or volume flow on the return line of the actuator may be adjusted so that the pressure on the return line of the actuator is lower than when the actuator is used in such a position or for such a movement where the Earth's gravity effect or a similar external factor does not slow down or accelerate movement. Similarly, when the actuator 22 is used in such a position or for such a movement where the Earth's gravity effect or a similar external factor accelerates movement, the pressure and/or volume flow on the return line of the actuator may be adjusted so that the pressure on the return line of the actuator is higher than when the actuator is used in such a position or for such a movement where the Earth's gravity effect or a similar external factor does not slow down or accelerate movement. A similar principle may be used when a movement or position An advantage of this control method is that by adjusting the pressure on the return line it is possible to form the required counterpressure effect from the viewpoint of the purpose of use, such as precise movement or staying in place of a structural element, with the lowest appropriate pressure value needed at any one time. This allows a work machine's movements to be controlled better than previously while at the same time minimizing the energy used for this control.

Those skilled in the art will find it obvious that, as technology advances, the basic idea of the invention may be implemented in many different ways. The invention and its embodiments are thus not restricted to the examples described above but may vary within the scope of the claims.

The invention claimed is:

1. An arrangement configured to control at least one operation of a work machine, the work machine comprising at least one structural element, at least one pressure medium operated actuator configured to establish said at least one operation, and at least one detection device configured to determine the position of the at least one structural element of the work machine, the arrangement comprising:

a control valve arrangement configured to control said actuator, and a control device configured to control said control valve arrangement, wherein said control device is configured to control said control valve arrangement to adjust the pressure and/or volume flow on a return line of said actuator as dependent on said position of said at least one structural element, wherein the control device is further configured to adjust the pressure and/or volume flow on the return line of said actuator via said control valve arrangement as dependent on the speed and/or acceleration of said at least one structural element, wherein the position of said at least one structural element comprises a tilt angle of said at least one structural element in the direction of at least one axis of the at least one structural element in relation to a reference direction, wherein the control device is configured to adjust the pressure and/or volume flow on the return line of said actuator via said control valve arrangement as dependent on a tilt angle of at least one body part of the work machine, so that the pressure and/or volume flow on the return line of said actuator is adjusted as dependent on the tilt angle caused by an inclination of a working surface of the work machine, wherein the at least one detection device comprises an inertial measurement unit (IMU), and wherein the work machine is a mobile work machine, the mobile work machine being a forwarder, a harvester, or another forest machine.

2. An arrangement as claimed in claim 1, wherein said control valve arrangement comprises a meter-in meter-out valve.

3. An arrangement as claimed in claim 1, wherein said reference direction comprises a direction of a gravity vector.

4. An arrangement as claimed in claim 1, wherein the control device is configured to control the control valve arrangement to adjust the pressure on the return line of the actuator lower when the position of the at least one structural element and the direction of the movement of the actuator are such that the acceleration of the Earth's gravity resists the movement of the actuator than when the position of the at least one structural element and the direction of the movement of the actuator are such that the acceleration of the Earth's gravity accelerates the movement of the actuator.

5. An arrangement as claimed in claim 1, wherein the control device comprises a regulator comprising control codes to control the control valve arrangement to adjust the pressure and/or volume flow on the return line of the actuator, as well as means to receive at least feedback information to control the control valve arrangement.

6. An arrangement as claimed in claim 1, wherein said operation comprises moving at least one structural element of a boom structure or loader of the work machine in relation to said at least one structural element, whose position is detected by the detector device, and/or another structural element of the boom structure or loader.

7. An arrangement as claimed in claim 1, wherein said at least one structural element comprises the at least one body part of the work machine.

8. A work machine comprising the arrangement as claimed in claim 1.

9. A non-transitory computer readable storage medium storing computer-readable program code executable by a processor to control the arrangement as claimed in claim 1.

10. An arrangement as claimed in claim 1, wherein the operation includes moving the at least one structural element to, and stopping the movement of the at least one structural element at, a desired position, via the at least one pressure medium operated actuator and the pressure on the return line.

11. An arrangement as claimed in claim 10, wherein the tilt angle is non-zero.

12. A method for controlling at least one operation of a work machine, the work machine comprising at least one structural element, at least one pressure medium operated actuator for establishing said operation, and at least one detection device configured to determine the position of said at least one structural element of the work machine, the method comprising:

controlling a control valve arrangement so that said control valve arrangement adjusts the pressure and/or volume flow on a return line of said actuator as dependent on said position of said at least one structural element, wherein the pressure and/or volume flow on the return line of said actuator is additionally adjusted via said control valve arrangement as dependent on the speed and/or acceleration of said at least one structural element, wherein the pressure and/or volume flow on the return line of said actuator is adjusted as dependent on a tilt angle of at least one body part of the work machine, so that the pressure and/or volume flow on the return line of said actuator is adjusted as dependent on the tilt angle caused by an inclination of a working surface of the work machine, wherein the at least one detection device comprises an inertial measurement unit (IMU), and wherein the work machine is a mobile work machine, the mobile work machine being a forwarder, a harvester, or another forest machine.

13. A method as claimed in claim 12, wherein said control valve arrangement comprises a meter-in meter-out valve.

14. A method as claimed in claim 12, wherein said position of the at least one structural element comprises a tilt angle of said at least one structural element in relation to at least one axis of the at least one structural element.

15. A method as claimed in claim 12, wherein the control valve arrangement is controlled to adjust the pressure on the return line of the actuator lower when said position of the at least one structural element and the direction of the movement of the actuator are such that the acceleration of the Earth's gravity resists the movement of the actuator than when said position of the at least one structural element and the direction of the movement of the actuator are such that the acceleration of the Earth's gravity accelerates the movement of the actuator.

16. A method as claimed in claim 12, wherein the control device comprises a regulator comprising control codes to control the control valve arrangement to adjust the pressure and/or volume flow on the return line of the actuator, as well as means to receive at least feedback information to control the control valve arrangement.

17. A method as claimed in claim 12, wherein said operation comprises moving at least one structural element of a boom structure or loader of the work machine in relation to said at least one structural element, whose position is detected by means of the detector device, and/or a second structural element of the boom structure or loader.

18. A non-transitory computer readable storage medium storing computer-readable program code executable by a processor to perform the method as claimed in claim 12.

\* \* \* \* \*